United States Patent [19]

Ferschl

[11] Patent Number: 5,248,992
[45] Date of Patent: Sep. 28, 1993

[54] HIGH NUMERICAL APERTURE IMAGE FORMING APPARATUS USING OPTICAL FIBERS FOR BOTH WRITING AND FOCUS CONTROL

[75] Inventor: Michael S. Ferschl, Rochester, N.Y.

[73] Assignee: Eastman Kodak Company, Rochester, N.Y.

[21] Appl. No.: 749,039

[22] Filed: Aug. 23, 1991

[51] Int. Cl.$^5$ ............................................ G01D 15/10
[52] U.S. Cl. .................................... 346/76 L; 346/108
[58] Field of Search .............. 346/108, 107 R, 106, 346/76 L

[56] References Cited

U.S. PATENT DOCUMENTS

| | | | |
|---|---|---|---|
| 4,990,771 | 2/1991 | Minoura et al. | 346/108 X |
| 5,146,241 | 9/1992 | Ferschl | 346/108 |
| 5,146,242 | 9/1992 | Zielinski | 346/108 |
| 5,159,352 | 10/1992 | Ferla et al. | 346/108 |
| 5,196,866 | 3/1993 | Ferschl et al. | 346/108 |

Primary Examiner—A. T. Grimley
Assistant Examiner—Nestor R. Ramirez
Attorney, Agent, or Firm—Leonard W. Treash, Jr.

[57] ABSTRACT

An image forming apparatus uses a printhead including both writing optical fibers and an autofocus optical fiber. Radiation emitting from the fibers is imaged by a high numerical aperture lens on writing and focusing surfaces, respectively. Radiation from the autofocus fiber is reflected back through the lens to a split detector focus sensing device. To produce an adequate detection window for focusing, the numerical aperture of the autofocus fiber is chosen to be substantially less than the numerical aperture of the writing fibers and of the lens.

7 Claims, 6 Drawing Sheets

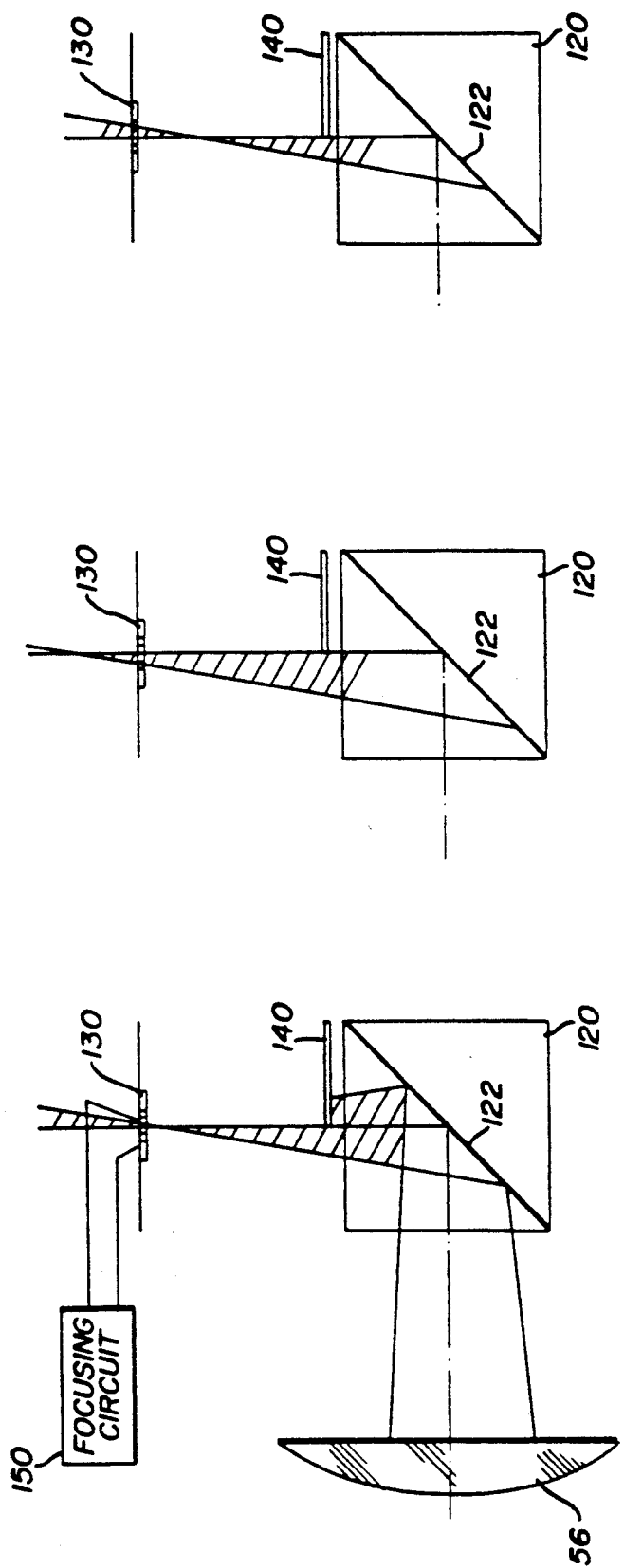

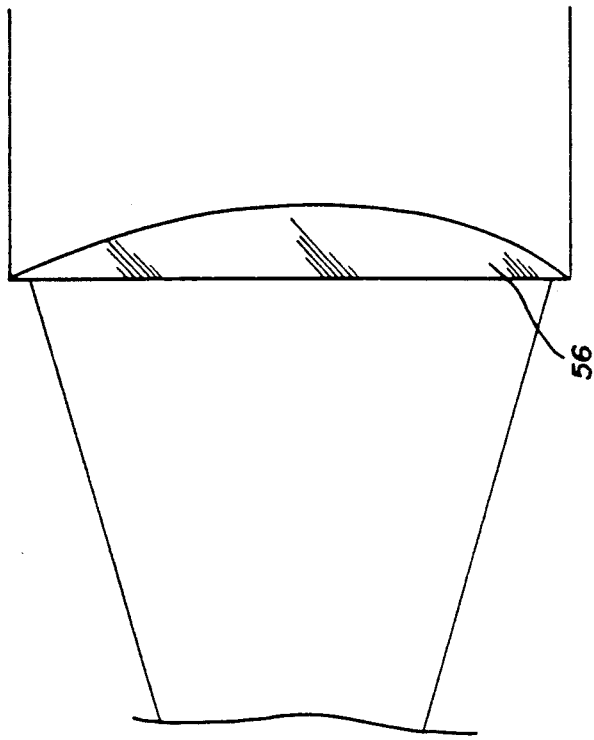
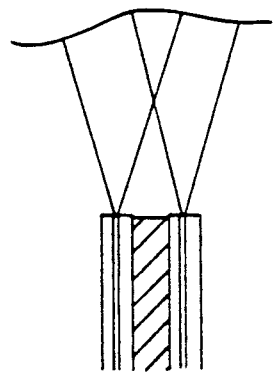
Fig. 8
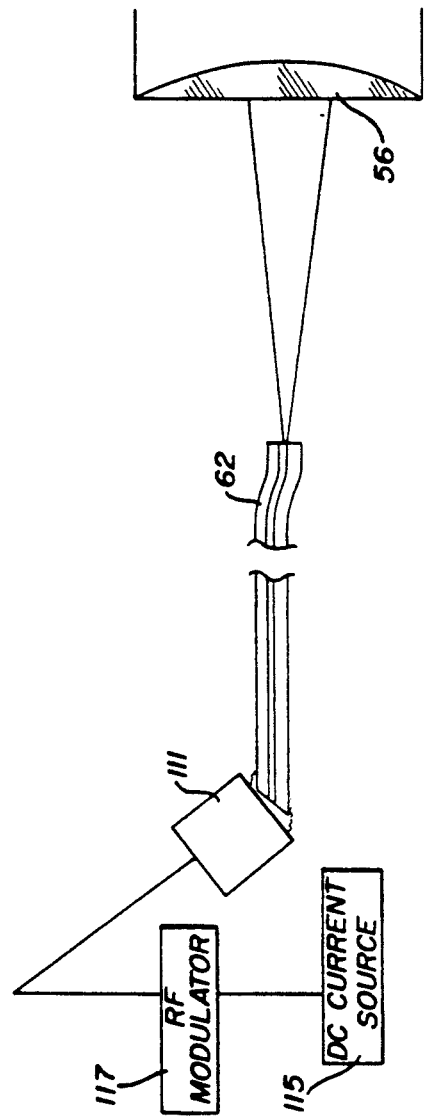
Fig. 9

HIGH NUMERICAL APERTURE IMAGE FORMING APPARATUS USING OPTICAL FIBERS FOR BOTH WRITING AND FOCUS CONTROL

FIELD OF THE INVENTION

This invention relates to an image forming apparatus having a printhead which includes a lens which images radiation from optical fibers both for image formation and for focus control. Although not limited thereto, it is particularly usable in a thermal printer using light emitting laser diodes to provide thermal energy to selectively transfer dye to a receiver to form an image.

BACKGROUND ART

In commonly-assigned U.S. Pat. applications Ser. Nos. 07/451,655 now Pat. No. 5,164,742 and 07/451,656 now Pat. No. 5,164,742 both filed Dec. 18, 1989, a thermal printer is disclosed which may be adapted for use as a direct digital color proofer with halftone capabilities. This printer forms an image on a thermal print medium in which a donor element transfers a dye to a receiver element in response to a sufficient amount of thermal energy. It includes a plurality of diode lasers which can be individually modulated to supply energy to selected areas of the medium in accordance with an information signal. The printer includes a printhead which includes one end of a fiber optic array having a plurality of optical fibers coupled to the diode lasers. A thermal print medium is supported on a rotatable drum, and the printhead with the fiber optic array is movable relative to the drum. Dye is transferred by sublimation to the receiver element as the radiation, transferred from the diode lasers to the donor element by the optical fibers is converted to thermal energy in the donor element.

Commonly-assigned U.S. application 07/670,092 filed Mar. 15, 1991, describes a high quality version of the color proofer from the earlier applications, which is capable of consistently and accurately writing pixels at a rate of 1800 dots per inch and higher to generate halftone proofs having a resolution of 150 lines per inch and above. Each dot or mini-pixel is held to a density tolerance of better than 0.1 density unit from that prescribed in order to avoid visible differences between the original and the proof.

This application describes an autofocus device for continuously focusing the writing beam as the image is formed to assure that variations in the thickness of the donor and receiving elements as well as other perturbations in the system do not de-focus the writing beam and adversely affect the image density or the sharpness of the image. Although autofocus can be accomplished by reflecting the writing beam off the top surface of the donor element, far better results are obtained according to that application by reflecting a separate autofocus beam off an aluminized surface on the receiver which, in fact, is closer to the dye layers of the donor than is the front surface of the donor element. The autofocus beam is generated from a laser diode having an output between 900nm–1,050nm, for example, 960–970nm. The writing beams on the other hand are generated by laser diodes having outputs in the range of 800nm to 880nm, which wavelengths are absorbed by each of the donor members in order to effectively write the image. The autofocus beam, at 960–970nm passes through the donor members and is reflected off the aluminized surface of the receiver.

The autofocus beam and the writing beams are both presented to the apparatus in the printhead by optical fibers from their laser diodes. The ends of the optical fibers are imaged on the appropriate surfaces by a high numerical aperture lens. The light from the autofocus beam is reflected off the aluminized surface back through the lens to appropriate detectors to accomplish autofocus.

SUMMARY OF THE INVENTION

In perfecting this device it was found highly desirable to use a lens of extremely high numerical aperture coupled with writing optical fibers of similarly high aperture. For example, numerical apertures of 0.25 and higher are used for both the writing optical fibers and the lens. This provides energy at the donor for high quality imaging at reasonable speeds. However, the open loop focus signal used by the autofocus detectors becomes tighter the higher the numerical aperture of the radiation incident on the detectors.

This problem has been solved by utilizing an optical fiber to provide the illumination for autofocus that has a numerical aperture substantially smaller than the numerical aperture of the writing fibers and of the lens.

If the surface off which the autofocus beam is reflected reflects the autofocus illumination specularly back upon itself, the wide aperture of the lens is not passed to the autofocus beam and the autofocus system "sees" radiation at the lower aperture. This effectively widens the open loop focus signal generated by electronics associated with the detectors. For example, an optical fiber having a numerical aperture of 0.20 is used to provide the autofocus beam while writing is done with optical fiber or fibers having a numerical aperture of 0.29 with both fibers or sets of fibers being imaged by a lens having a numerical aperture of 0.25 or better.

SPECIFIC DESCRIPTION OF THE DRAWINGS

FIGS. 5, 6 and 7 are top schematic views illustrating different conditions of focus at the detecting portion of the autofocus system.

FIG. 8 is a side schematic illustrating the numerical apertures of optical fibers and a lens which forms a portion of the imaging apparatus.

FIG. 9 is a top schematic illustrating the connection of a laser diode to an optical fiber in the FIG. 1 apparatus.

DESCRIPTION OF THE PREFERRED EMBODIMENT

Figure 1:
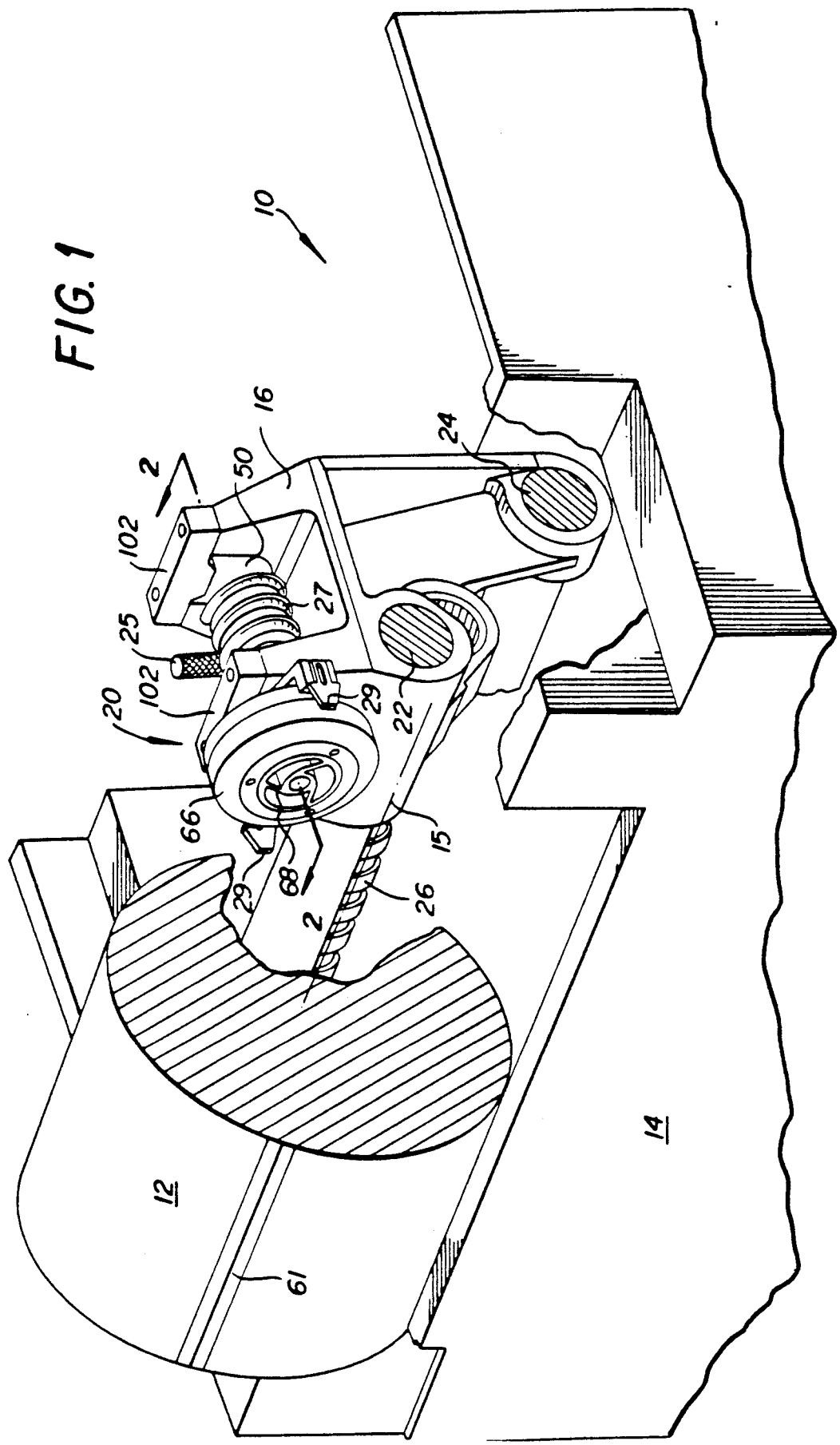
FIG. 1 is a perspective view of the imaging apparatus of the present invention, partially cut-away to reveal hidden portions thereof.

Referring now to FIG. 1, there is shown a thermal printer 10 comprising a drum member 12 mounted for rotation about an axis 15 in frame member 14. The drum member 12 is adapted to support a thermal print medium, not shown, of a type in which a dye is transferred by sublimation from a donor element to a receiver element as a result of heating the dye in the donor. The donor element and the receiver element are superposed in relatively intimate contact and are held onto the peripheral surface of the drum member by means such as by vacuum applied to the superposed elements from the drum interior. A thermal print medium for use with the printer 10 can be, for example, the medium disclosed in U.S. Pat. No. 4,772,582, which includes a donor sheet having a material which strongly absorbs at the wavelength of the exposing light source. When the donor element is irradiated, this absorbing material converts light energy to thermal energy and transfers the heat to the dye in the immediate vicinity, thereby heating the dye to its vaporization temperature for transfer to the receiver element. The absorbing material may be present in a layer beneath the dye, or it may be admixed with the dye and is strongly absorptive to light having wavelengths in the range of 800nm-880nm. An example of a preferred embodiment of a receiver element that can be used with the present invention is disclosed in co-pending, commonly assigned U.S. Pat. application Ser. No. 606,404, entitled *Intermediate Receiver Opaque Support*, and filed Oct. 31, 1990. The receiver element disclosed therein incorporates a reflective layer which improves the efficiency of the dye transfer to the receiver element.

The light source is movable with respect to the drum member and is arranged to direct a beam of actinic light to the donor element. Preferably the light source comprises a plurality of laser diodes which can be individually modulated by electronic signals which are representative of the shape and color of the original image, so that each dye is heated to cause volatilization only in those areas in which its presence is required on the receiver to reconstruct the color of the original object. In the preferred embodiment, the laser diodes are mounted remotely from the drum member 12, on the stationary portion of the frame 14, and each direct the light produced thereby to the input end of a respective optical fiber which extends to and transfers the light to a movable writing head 20 adjacent the drum member. The laser diodes are selected to produce a first beam of light having wavelengths in the range of 800nm-880nm, and preferably predominately at a wavelength of 830nm.

The writing head 20 is moveably supported adjacent drum member 12 and is mounted on a moving translator member 2 which, in turn, is supported for slidable movement on bars 22 and 24. The bars 22 and 24 are sufficiently rigid that they do not sag between the mounting points at their ends and are arranged as exactly parallel with the axis of the drum member as possible. The upper bar 22 is arranged to locate the writing head precisely on the axis of the drum with the axis of the writing head perpendicular to the drum axis. The upper bar 22 locates the translator in the vertical and the horizontal directions with respect to the axis of the drum member. The lower bar 24 locates the translator member only with respect to rotation of the translator about the bar 22 so that there is no over-constraint of the translator which might cause it to bind, chatter, or otherwise impart undesirable vibration to the writing head during the generation of an image. The translator member 16 is driven by means of a motor (not shown) which rotates a lead screw 26 parallel to bars 22 and 24 to move the writing head parallel with the axis of the drum member. The coupling (not shown) which connects the translator member to the lead screw is carefully chosen so that the only force imparted to the translator by the lead screw is parallel to the drum axis.

The writing head 20 is removably mounted on the translator member 16 so that it automatically adopts the preferred orientation with respect to the drum axis noted above. The writing head is selectively locatable with respect to the translator, and thus with respect to the drum surface and axis, with regard to its distance from the drum surface, and with respect to its angular position about its own axis. Accordingly, a pair of adjustable locating means are provided to accurately locate the writing head with respect to these two axes on the translator member 16. Only one of the adjustable locating means, a micrometer adjustment screw 25, is illustrated, A torsion and compression spring 27 is provided to load the writing head against these locating means.

The end of the writing head 20 adjacent the drum member 12 is provided with a pair of photosensors 29 aimed at the surface of the drum member. The photosensors may each include an infrared source or they may rely on an outside source of light energy. The photosensors are disposed on diametrically opposite sides of the optical axis of the writing head in a fixed relationship thereto.

Figure 2:
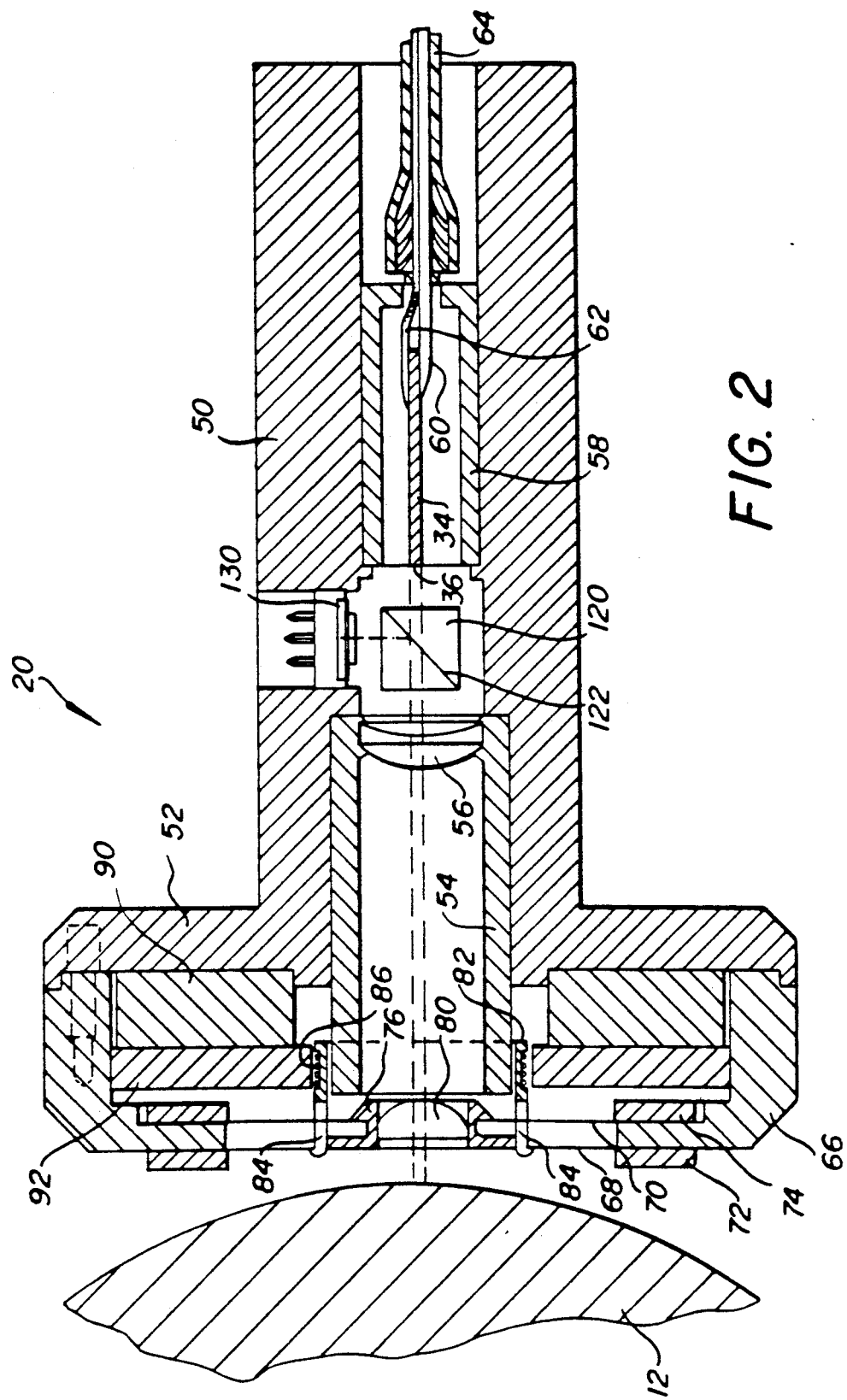
FIG. 2 is a sectional view of the writing head and lens assembly taken along line 2—2 of FIG. 1.

A cross section of the writing head 20 is illustrated in FIG. 2 and comprises a generally cylindrical barrel portion 50 having a flange 52 at the drum end thereof. The interior of the barrel portion is arranged to accept a stationary lens barrel 54 at the writing end, containing a stationary lens 56. A printhead assembly 58 is selectively oriented within and at the opposite end of the barrel from the writing end. The printhead assembly comprises a tubular member selectively oriented within barrel portion 50 and contains a linear array of optical fibers which includes a fiber-supporting wafer 34 having a plurality of optical fibers 60 mounted thereon. The optical fibers have a writing end 36 facing the drum member 12 at the opposite end of the barrel. The optical fibers 60 extend from the end of the printhead assembly and out of the writing head barrel through a protective sheath 64 to the diode lasers, not shown.

A cup-shaped closure member 66 is arranged to mate with the flange 52 of the writing head barrel 50 and forms a housing for the focusing drive means, as will be described hereinbelow. The end of the closure member adjacent drum member 12 is provided with an axially disposed opening which is bridged by a pair of sheet flexure members, 68 and 70, mounted at the outer periphery thereof by annular plate means 72 and 74 to the closure member 66. The central portions of the sheet flexure members are mounted to a movable rigid cylindrical lens housing 76 which contains moveable lens 80. A cylindrical bobbin 82 is disposed around the end of stationary lens barrel 54 and is connected to the moveable lens housing 76 via equally spaced arms 84 which extend between the legs of the flexure members 68 and 70. A voice coil 86 is wound about the cylindrical portion of the bobbin 82 and is connected to a driving circuit, to be further described hereinbelow.

Also enclosed between the end closure 66 and flange 52 is a high power, toroidal magnet 90 and an annular magnetic plate 92 which are both disposed about and spaced from the end of stationary lens barrel 54. The voice coil portion of the bobbin 82 is disposed in the gap between the inner circumference of plate 92 and the outer circumference of stationary lens barrel 54. The dimensions of the magnet, the annular plate, the stationary lens barrel, and the bobbin are such that the bobbin can move freely axially of the lens barrel. The bobbin is supported in the gap by its attachment to the moveable lens housing 76 which is held in position by the plate flexures 68 and 70. It will be noted that the barrel portion 50, flange 52, the stationary lens barrel 54, and annular plate 92, are all formed of magnetic material, such as ordinary steel, so that in combination with the toroidal magnet 90, a strong magnetic field is created between the inner periphery of the annular plate 92 and the end of the stationary lens barrel 54. As a result, when a current is introduced into the voice coil 86 of the bobbin 82, as by a lens focusing circuit (not shown), an axial force is imparted to the bobbin and to the moveable lens housing 76, thereby selectively moving the moveable lens 80 along the optical axis of the assembly. Thus, with an appropriate focus detection system, to be described hereinbelow, the moveable lens assembly may be driven to assure that the output of the fiber optic array is maintained in focus at the appropriate position on the drum member 12, or on or within the writing element (not shown) mounted thereon.

Figure 3:
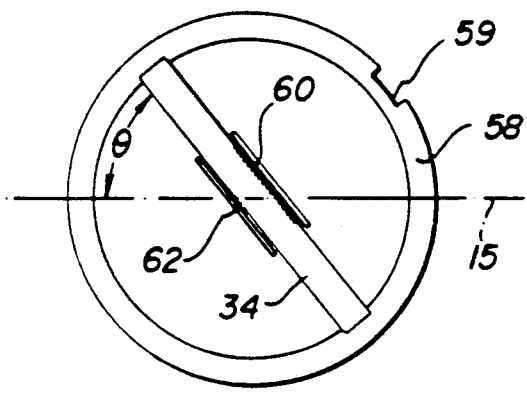
FIG. 3 is an end view of the printhead assembly.
Figure 4:
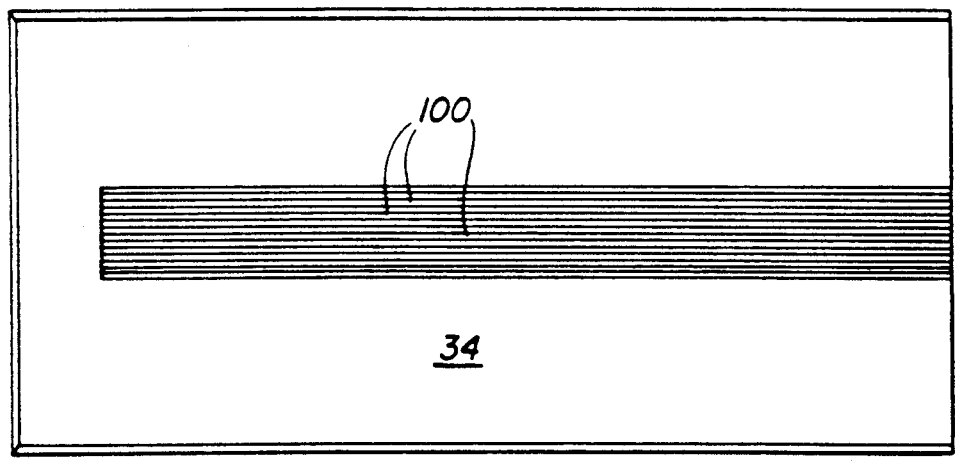
FIG. 4 is a plan view of an optical fiber supporting substrate.

The fiber optic array (see FIGS. 2 and 3) comprises a plurality of fibers 60 which are each connected to a respective, remotely mounted diode laser, not shown. The diode lasers can be individually modulated to selectively project light from the writing end 36 of the optical fibers through the lens assembly, consisting of stationary lens 56 and movable lens 80, onto the thermal print medium carried by the drum member 12. The fiber optic array can be of the type shown in FIG. 3 and comprises optical fibers 60 which are supported on the substrate 34. The array may be of the type shown in co-pending, commonly assigned U.S. application Ser. No. 451,656, filed Dec. 18, 1989. Each of the optical fibers includes a jacket, a cladding, and a core, as is well known in the art. As disclosed in the copending application, the fibers extend from the laser diodes to the array and are mounted in sets of grooves 100 (FIG. 4) which are formed in the substrate so that the fibers at the writing end 36 are disposed substantially parallel and adjacent to each other in very close proximity, with the ends disposed in a common plane perpendicular to the fiber axes.

The focus detection system comprises a second array of optical fibers 62 mounted on the opposite surface of the substrate 34 with respect to the writing array 60. The focusing array 62 requires only a single fiber, but in practice, three fibers may be provided, with two as extras in case the first fiber fails. The focusing fiber is connected at its inlet end to a laser diode 111 (FIG. 9) which may be mounted in the same region with the writing diodes, but which is selected to produce a second beam of light having a wavelength different from the wavelength of the writing beam and preferably outside the range of 800nm–880nm. In the preferred embodiment the focusing light source produces a beam of light having a predominant wavelength of 960nm. It has been found that a focusing beam having a wavelength of 960nm is substantially unabsorbed by all of the various donor dye materials. As a result, substantially all of the focusing beam of this wavelength will penetrate the donor material, regardless of the color dye employed, to be reflected from the reflective surface which is part of the receiver element. Inasmuch as this surface has been found to be much closer to the dye layer, where it is desirable to focus the writing beam, than the top surface of the donor layer, it is possible for both the writing beam and the focusing beam to be aimed at more nearly the same surface than is possible if the focusing beam is reflected from the top surface of the donor element. As a result, the writing beam may have less depth of focus and consequently may have a greater numerical aperture which permits the transmission of greater writing power to the writing element than would be the case were the focusing beam and the writing beam to be focused at more widely separated surfaces.

The focus detection system also includes a beam splitter 120, having a semi-reflective buried surface 122, which is disposed between the writing end 36 of the linear array 60 and the stationary lens 56. A split cell photodetector 130 is disposed in the sidewall of barrel 50 and is arranged to receive the portion of the focusing beam which is reflected from the writing element and by the buried layer of the beam splitter. A knife edge is provided between the beam splitter and the photocell and the photocell is provided with a mask to shield it from stray light.

The focus detection system includes the laser diode producing a beam of light having a wavelength of 960nm. The focusing optical fiber 62 which is disposed on the opposite of the mounting substrate from the linear array of the writing beam, and which is arranged to project the focusing beam through the lenses 56 and 80, and onto the writing element. The focusing beam is spectrally reflected from the aluminized reflective surface of the receiver element back upon itself, through the lens 56 and into the beam splitter 120 wherein a portion of the reflected focusing beam is deflected by a buried surface or layer 122 into the split cell photodetector 130. Preferably, photodetector 130 has a preferential wavelength sensitivity to the wavelength of the focusing beam, i.e. 960–970nm. The signal from the photocell 130 is fed to a focusing circuit 150 (FIG. 5), which then generates an appropriate current which is supplied to the voice coil 86 on the bobbin attached to the movable lens element 80. In this way the focus detection system constantly monitors the location of a surface closely adjacent the surface of the writing element on which the writing beam is to be concentrated.

The operation of split cell photodetector 130 is illustrated in FIGS. 5, 6, 7 and 11. In this system, which is known per se, a blocking element, for example, knife edge 140 (FIGS. 5–7), blocks half of the light beam exiting beam splitter 120 and approaching detectors 130. Blocking means 140 can be supported by the exit surface of beam splitter 120. This same exit surface can also include a filter which filters out any stray writing radiation which might have also been reflected by layer 22. Such a filter absorbs or reflects writing illumination but passes autofocus illumination.

An image of the core of the ending of fiber 62 which has been reflected off the receiver element is re-imaged by lens 56 as a spot on detectors 130. The fiber core is sized so that the imaged spot overlaps both detectors equally in the in-focus condition shown in FIG. 5. When the lens 56 is out of focus in either direction, as shown in FIGS. 6 and 7, one of the detectors receives more of the radiation than the other. Focusing circuit 150 essentially determines the difference between the outputs of the two detectors and generates a focus signal dependent upon that difference to move movable lens element 80 in the correct direction.

It is desirable for highest quality of writing at reasonable speeds to provide a high numerical aperture for both the writing fibers and the lens 56, for example, a numerical aperture 0.25 or higher. This system has been successfully operated at reasonable speeds with a numerical aperture for both writing fibers and lens 56 between 0.25 and 0.29. At such a high aperture, the autofocus has a relatively tight focus signal, is more sensitive to dust or imperfections in the reflecting surface, and has a tendency to hunt excessively.

Figure 11:
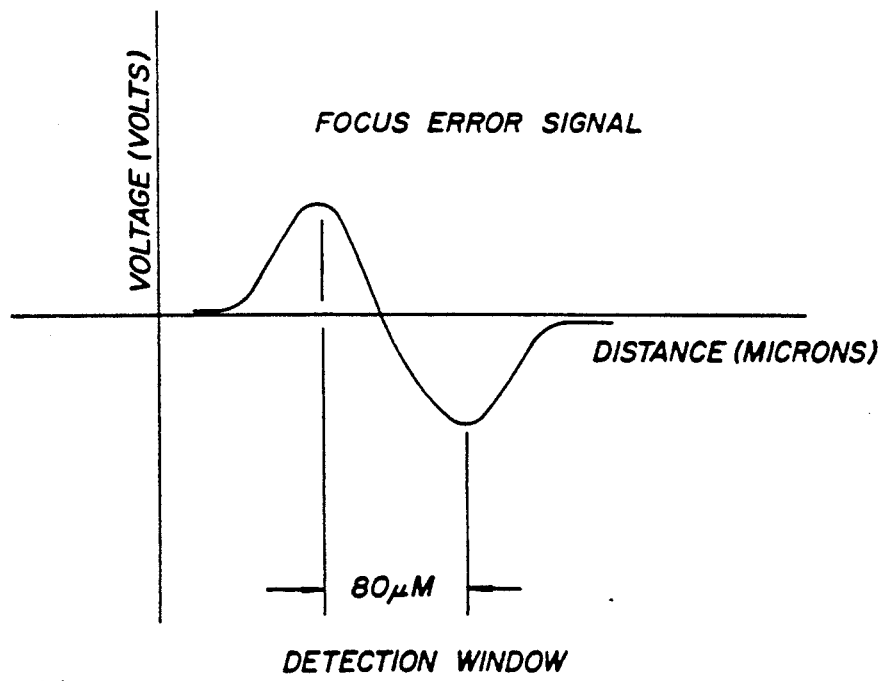
FIG. 11 is a graph illustrating a focus error signal for an autofocus device constructed generally according to FIGS. 5-8.

This condition can be improved by using an optical fiber 62 for the autofocus portion of the apparatus which has a lower numerical aperture than that at which the writing system is operating. For example, using a fiber having a core with a diameter of 50 microns and a numerical aperture of 0.20, a detection window of 80 microns can be provided. This is illustrated in FIG. 11 in which the focus error signal is shown as a plot of voltage against the distance of movement of the spot along the optical axis at the detector 130. The condition of best focus is illustrated by the point at which the curve passes the axis. If the system is outside of the detection window then the autofocus will not correct itself. The detection system of 80 microns provides consistent focusing despite the high numerical aperture of the writing portion of the system.

FIG. 9 schematically illustrates another aspect of the focusing device. Laser diode 111 is optically connected to autofocus fiber 62 which provides at its emitting end a 50 micron spot for autofocus as described above. It is important in obtaining the signal shown in FIG. 11 to have as uniform illumination as possible both spatially across the core ending of the fiber and temporally. To obtain a desirable 50 micron spot for focusing while using a laser diode 111 having an output that is not absorbed by the dye layers, for example, the output of a wavelength of 960-970nm described above, creates an additional problem with respect to such uniformity. Available laser diodes operating at, for example, 960-970nm are of a single mode type. When such a diode is connected to a multimode fiber having a 50 micron diameter core an interference pattern is created that is anything but uniform exiting the fiber. This non-uniform illumination creates a focus signal that is difficult to use in this application.

Figure 10:
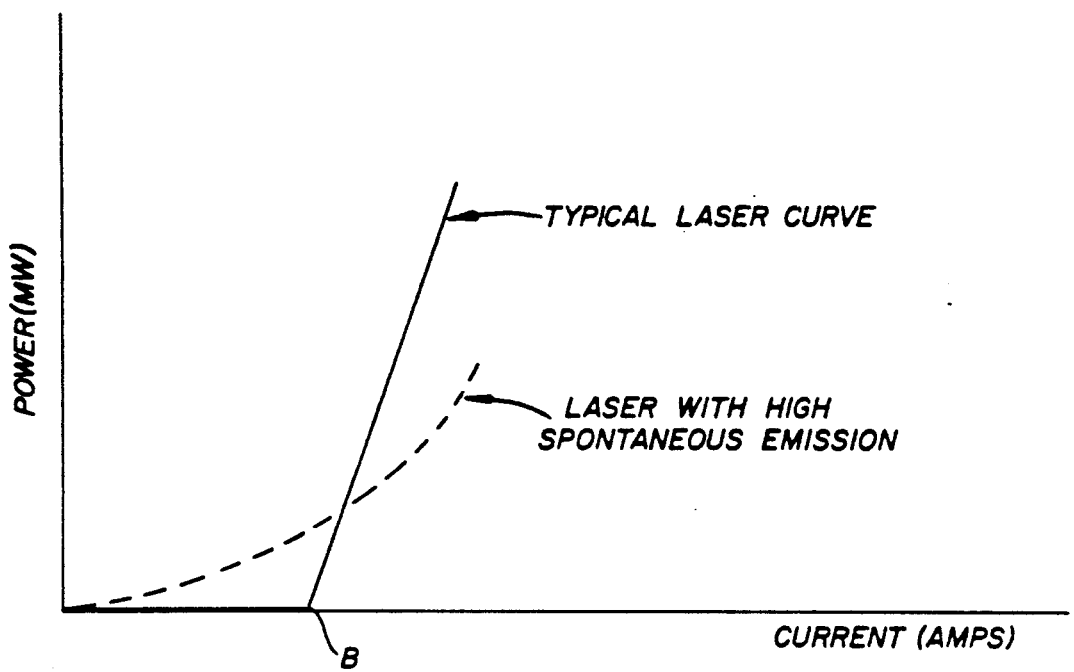
FIG. 10 is a graph illustrating the emission of a typical diode laser and comparing it with the emission of a high spontaneous emission diode laser.

This problem is corrected by spoiling the coherence of diode 111. That is, if diode 111 is manufactured to emit in the wavelength desired, but the emission is made deliberately less efficient, that emission can be made sufficiently incoherent to provide a uniform spot. More specifically, the lack of coherence so disturbs the interference pattern associated with the fiber that the spot is sufficiently uniform to provide a good strong focus signal as shown in FIG. 11. The output of such a diode is illustrated schematically by the graph in FIG. 10 in which the solid curve illustrates a typical quality laser diode output while the dotted line curve illustrates the same laser diode but with the emission or at least the coherence thereof spoiled. The laser diode then has substantial spontaneous emission from which interference patterns are slight or non-existent in the multimode fiber 62.

There are several known methods for reducing the coherence of a laser diode. For example, the reflection characteristics of the laser cavity can be deliberately made less than ideal. This is accomplished by modifying the optical coatings on the back facet and/or on the output facet of the diode. The modification would vary according to the makeup of the diode, and is a skill known in the art. A somewhat less effective and more expensive approach is illustrated in FIG. 9. The drive current for the laser diode 111 from a DC current source 115 is modulated by an RF modulator 117. This modulation is done at a high frequency but has a small amplitude, for example, 5% of the drive current. It is modulated around the point B on the curve shown in FIG. 10. This has the effect of turning the diode rapidly on and off which reduces the coherence of the output. When tried, this approach increased the uniformity of the autofocus spot, but was less effective and more expensive than modifying the diode itself.

The invention has been described in detail with particular reference to a preferred embodiment thereof, but it will be understood that variations and modifications can be effected within the spirit and scope of the invention as described hereinabove and as defined in the appended claims.

I claim:

1. An image forming apparatus comprising: at least one source of writing radiation, at least one source of autofocus radiation, a printhead including
   at least a first optical fiber optically coupled to said source of writing radiation and having a first fiber ending from which writing radiation is emitted,
   at least a second optical fiber optically coupled to said source of autofocus radiation and having a second autofocus fiber ending from which autofocus radiation is emitted,
   autofocus detection means sensitive to said autofocus radiation, and
   a lens for projecting radiation emitted from said first fiber ending onto a member sensitive to the writing radiation and for simultaneously projecting autofocus radiation emitted from said second fiber ending on a reflecting surface at a comparable optical position to said sensitive member, and for projecting autofocus radiation reflected from said reflecting surface onto said autofocus detection means,
   characterized in that the numerical apertures of the lens and the first optical fiber are each substantially higher than the numerical aperture of the second optical fiber.

2. An image forming apparatus according to claim 1 wherein said printhead includes more than one writing optical fiber and radiation source combination positioned to form a linear array of optical fiber endings.

3. The image forming apparatus according to claim 1 wherein said lens and writing fiber each have a numerical aperture greater than, 0.25 and said autofocus fiber has a numerical aperture less than 0.22.

4. An image forming apparatus according to claim 1 wherein said reflecting surface is an aluminized surface which specularly reflects said autofocus radiation back upon itself.

5. An image forming apparatus according to claim 1 further including a beam splitter positioned between said lens and said autofocus detecting means for reflecting said autofocus radiation to said autofocus detecting means and means between said beam splitter and said autofocus detection means for blocking a portion of the radiation approaching said autofocus detecting means.

6. Image forming apparatus according to claim 5 wherein a face of said beam splitter supports a filter blocking said writing illumination but passing said autofocus illumination.

7. An image forming apparatus according to claim 5 wherein said autofocus detection means includes a pair of photodetectors positioned to monitor opposite portions of an image of said autofocus fiber ending.

* * * * *